(12) United States Patent
Tanabe

(10) Patent No.: US 12,253,034 B2
(45) Date of Patent: Mar. 18, 2025

(54) FUEL CONTROL DEVICE FOR GAS TURBINE

(71) Applicant: MITSUBISHI HEAVY INDUSTRIES, LTD., Tokyo (JP)

(72) Inventor: Hiroshi Tanabe, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/273,351

(22) PCT Filed: Mar. 22, 2022

(86) PCT No.: PCT/JP2022/013191
§ 371 (c)(1),
(2) Date: Jul. 20, 2023

(87) PCT Pub. No.: WO2022/202818
PCT Pub. Date: Sep. 29, 2022

(65) Prior Publication Data
US 2024/0309816 A1 Sep. 19, 2024

(30) Foreign Application Priority Data
Mar. 25, 2021 (JP) .................. 2021-051222

(51) Int. Cl.
*F02C 7/232* (2006.01)
*F02C 9/28* (2006.01)
*F02C 9/32* (2006.01)

(52) U.S. Cl.
CPC .................. *F02C 9/28* (2013.01); *F02C 9/32* (2013.01); *F05D 2240/35* (2013.01)

(58) Field of Classification Search
CPC .................. F02C 7/232; F02C 9/32
See application file for complete search history.

(56) References Cited

U.S. PATENT DOCUMENTS

2004/0237535 A1* 12/2004 Ainsworth ............. F01D 19/02
60/39.511
2006/0150633 A1 7/2006 McGinley et al.
(Continued)

FOREIGN PATENT DOCUMENTS

| JP | 2004-68685 | 3/2004 |
| JP | 2004-522052 | 7/2004 |

(Continued)

OTHER PUBLICATIONS

International Search Report issued Jun. 14, 2022 in corresponding International Application No. PCT/JP2022/013191, with English translation.

(Continued)

*Primary Examiner* — Katheryn A Malatek
(74) *Attorney, Agent, or Firm* — Wenderoth, Lind & Ponack, L.L.P.

(57) ABSTRACT

A gas turbine includes a compressor for producing compressed air, a combustor for burning fuel with the compressed air, and a turbine driven by combustion gas generated by burning the fuel in the combustor, and is switchable between a normal operation mode which is an operation mode where a motor generator is driven by the turbine and a reverse power operation mode where the motor generator provides rotational power to the gas turbine. A fuel control device includes: a first valve for regulating pressure of fuel supplied to the combustor within a range of a first lower limit value and a first upper limit value; and a second valve for regulating pressure of the fuel supplied to the combustor within a flow rate range of a second lower limit value larger than the first lower limit value and a second upper limit value larger than the first upper limit value.

3 Claims, 4 Drawing Sheets

(56) References Cited

U.S. PATENT DOCUMENTS

| | | | |
|---|---|---|---|
| 2014/0216047 A1 | 8/2014 | Morisaki et al. | |
| 2018/0112604 A1* | 4/2018 | Akiyama | F02C 7/232 |
| 2019/0128183 A1* | 5/2019 | Morii | F02C 7/232 |
| 2020/0080480 A1* | 3/2020 | Horikawa | F23R 3/346 |

FOREIGN PATENT DOCUMENTS

| | | |
|---|---|---|
| JP | 2014-47728 | 3/2014 |
| JP | 2014-148933 | 8/2014 |
| WO | 02/088531 | 11/2002 |

OTHER PUBLICATIONS

International Preliminary Report on Patentability mailed Oct. 5, 2023 in corresponding International Application No. PCT/JP2022/013191, with English translation.

\* cited by examiner

FUEL CONTROL DEVICE FOR GAS TURBINE

TECHNICAL FIELD

The present disclosure relates to a fuel control device for a gas turbine.

This application claims the priority of Japanese Patent Application No. 2021-051222 filed on Mar. 25, 2021, the content of which is incorporated herein by reference.

BACKGROUND

For example, Patent Document 1 describes power generation by driving a generator with a gas turbine.

A fuel supply amount to a gas turbine is required to be controlled over a wide range from a fuel supply amount necessary for ignition to a fuel supply amount necessary for maximum output. Therefore, in general, in order to regulate a pressure of fuel supplied to a fuel nozzle, a low flow pressure regulating valve and a high flow pressure regulating valve are used properly. In the case of such configuration, in consideration of stability of fuel supply control, after ignition, the low flow pressure regulating valve is switched to the high flow pressure regulating valve in a transition region during acceleration, and the pressure of fuel is generally controlled only with the high flow pressure regulating valve during no-load operation which is a constant-speed operation region.

CITATION LIST

Patent Literature

Patent Document 1: JP2014-47728A

SUMMARY

Technical Problem

However, when a gas turbine is operated in a reverse power operation mode where rotational power is provided to the gas turbine by electric power supplied from outside the gas turbine, a fuel supply amount decreases relative to during no-load constant-speed operation, which may cause a situation where operation must be performed near a switching point from the high flow pressure regulating valve to the low flow pressure regulating valve. If the high flow pressure regulating valve is switched to the low flow pressure regulating valve, there is a risk that the fuel supply amount changes discontinuously due to the characteristics of the valves, resulting in unstable control.

In view of the above, an object of at least one embodiment of the present disclosure is to provide a fuel control device for a gas turbine, which can appropriately control fuel supply to a combustor of the gas turbine in the reverse power operation mode.

Solution to Problem

In order to achieve the above object, a fuel control device for a gas turbine according to the present disclosure is a fuel control device for a gas turbine, the gas turbine including a compressor for producing compressed air, a combustor for burning fuel with the compressed air, and a turbine driven by a combustion gas generated by burning the fuel in the combustor, and being switchable between a normal operation mode which is an operation mode where a motor generator is driven by the turbine and a reverse power operation mode which is an operation mode where the motor generator provides the rotational power to the gas turbine, the fuel control device including: a first valve capable of regulating a pressure of the fuel supplied to the combustor within a flow rate range of a first lower limit value and a first upper limit value, and a second valve capable of regulating the pressure of the fuel supplied to the combustor within a flow rate range of a second lower limit value larger than the first lower limit value and a second upper limit value larger than the first upper limit value. A regulation target for regulating the pressure of the fuel is changed from the second valve to the first valve before a flow rate of the fuel is decreased to a flow rate for the reverse power operation mode, when switching from the normal operation mode to the reverse power operation mode.

Further, a fuel control device for a gas turbine according to the present disclosure is a fuel control device for a gas turbine, the gas turbine including a compressor for producing compressed air, a combustor for burning fuel with the compressed air, and a turbine driven by a combustion gas generated by burning the fuel in the combustor, and being switchable between a normal operation mode which is an operation mode where a motor generator is driven by the turbine and a reverse power operation mode which is an operation mode where the motor generator provides the rotational power to the gas turbine, the fuel control device including a plurality of valves capable of regulating a pressure of the fuel supplied to the combustor. A regulation target for regulating the pressure of the fuel is at least two valves among the plurality of valves, in the normal operation mode. The regulation target for regulating the pressure of the fuel is changed to one valve among the plurality of valves before a flow rate of the fuel is decreased to a flow rate for the reverse power operation mode, when switching from the normal operation mode to the reverse power operation mode.

Advantageous Effects

With the fuel control device for the gas turbine according to the present disclosure, the discontinuity of the fuel supply amount based on valve characteristics is eliminated during operation in the reverse power operation mode by the absence of switching between the first valve and the second valve in the reverse power operation mode, making it possible to suppress fluctuation in operation of the gas turbine and making it possible to appropriately control the fuel supply to the combustor.

DETAILED DESCRIPTION

Hereinafter, a fuel control device for a gas turbine according to the embodiments of the present disclosure will be described with reference to the drawings. The embodiment to be described below indicates one aspect of the present disclosure, does not intend to limit the disclosure, and can optionally be modified within a range of a technical idea of the present disclosure.

Figure 1:
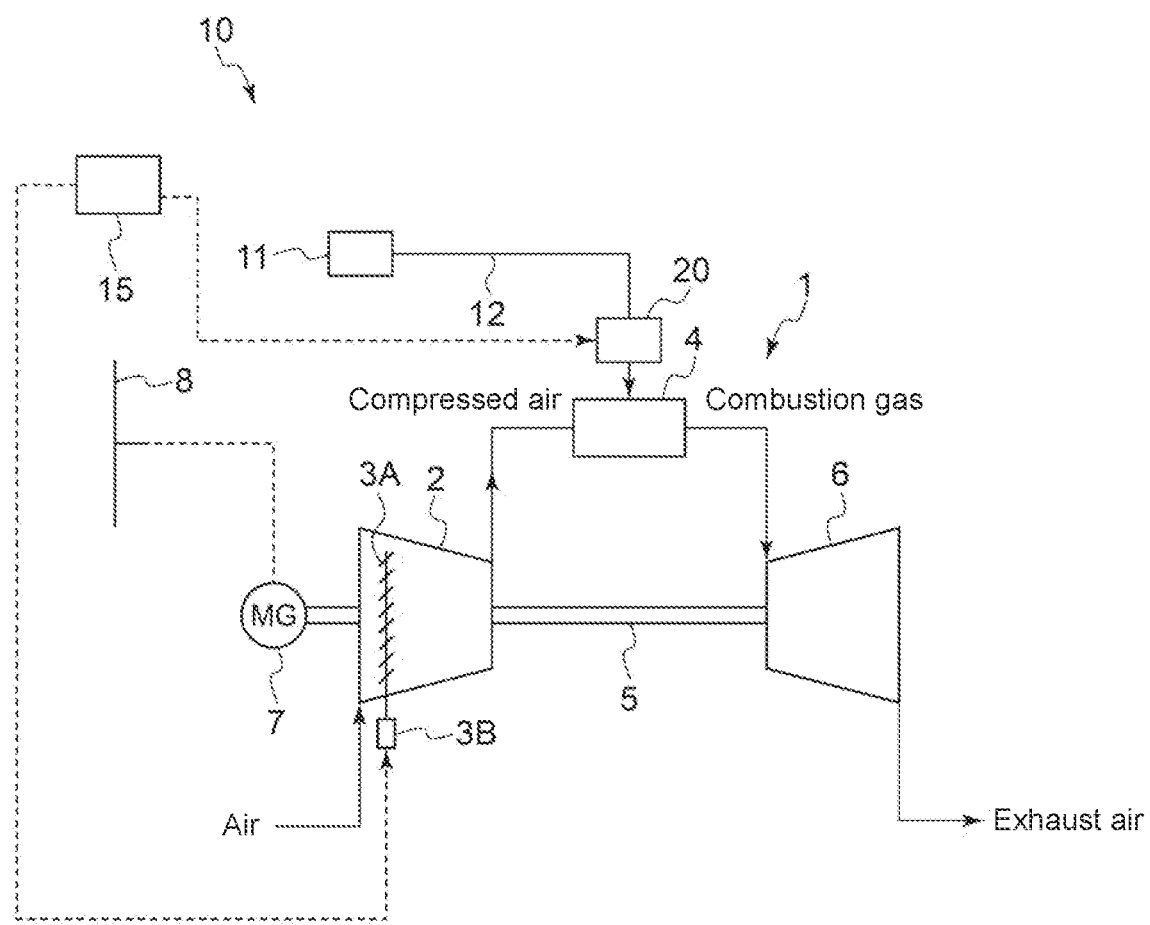
FIG. 1 is a configuration diagram of a gas turbine system including a fuel control device for a gas turbine according to an embodiment of the present disclosure.

Configuration of Fuel Control Device for Gas Turbine According to Embodiment of Present Disclosure As shown in FIG. 1, a gas turbine system 10 includes a gas turbine 1 that includes a combustor 4 for burning fuel to generate a combustion gas, a compressor 2 for supplying compressed air serving as combustion air to the combustor 4, and a turbine 6 which shares a common rotational shaft 5 with the compressor 2 and is configured to be driven by the combustion gas generated by the combustor 4. The rotational shaft 5 is connected to a motor generator 7, and the motor generator 7 is configured to be electrically connectable to a power system 8 outside the gas turbine 1. An inlet of the compressor 2 is provided with an inlet guide vane (IGV) 3A for adjusting an intake air amount. The opening degree of the IGV 3A is configured to be adjustable by an actuator 3B (inlet guide vane control device). The actuator 3B is electrically connected to the controller 15.

Figure 2:
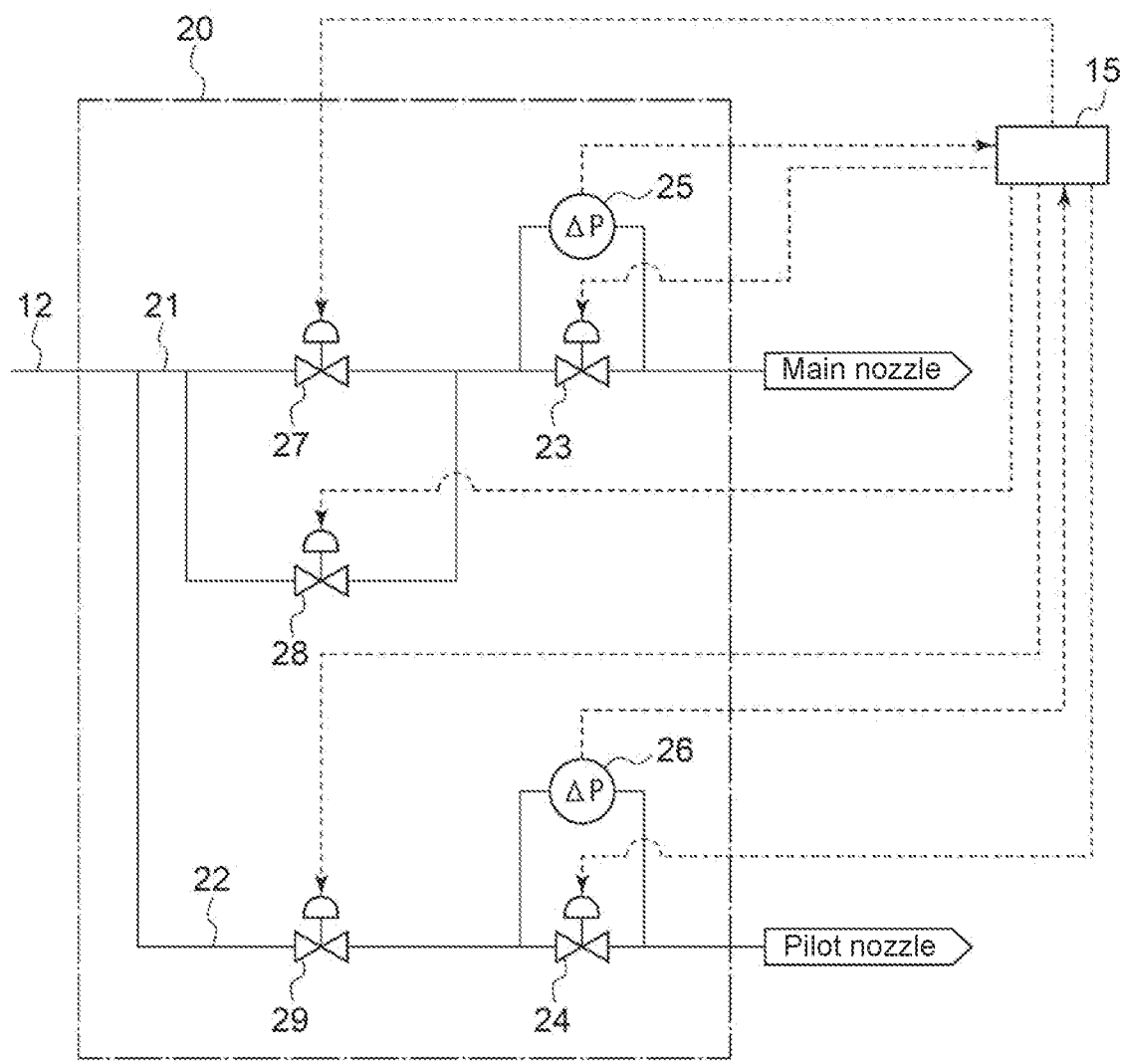
FIG. 2 is a configuration diagram of the fuel control device for the gas turbine according to an embodiment of the present disclosure.

The combustor 4 is configured to be supplied with fuel from a fuel supply source 11 via a fuel supply line 12. The fuel supply line 12 is provided with a fuel control device 20 for regulating the flow rate (fuel supply amount) of the fuel supplied to the combustor 4. FIG. 2 shows the configuration of the fuel control device 20. Within the fuel control device 20, the fuel supply line 12 branches into a main fuel supply line 21 and a pilot fuel supply line 22 that, respectively, communicate with a main nozzle and a pilot nozzle of the combustor 4 (see FIG. 1). The fuel control device 20 includes: a main fuel control valve 23 disposed on the main fuel supply line 21 and configured to adjust a fuel supply amount to the main nozzle; a pilot fuel control valve 24 disposed on the pilot fuel supply line 22 and configured to adjust a fuel supply amount to the pilot nozzle; a differential pressure gauge 25, 26 configured to detect a differential pressure between an upstream side and a downstream side of each of the main fuel control valve 23 and the pilot fuel control valve 24; a first valve 27 and a second valve 28 which are differential pressure regulating valves disposed in parallel with each other on the main fuel supply line 21 on the upstream side of the main fuel control valve 23; and a differential pressure regulating valve 29 disposed on the pilot fuel supply line 22 on the upstream side of the pilot fuel control valve 24.

The main fuel control valve 23 and the pilot fuel control valve 24 are electrically connected to the controller 15, and the controller 15 is configured to adjust the respective opening degrees of the main fuel control valve 23 and the pilot fuel control valve 24. The first valve 27, the second valve 28, and the differential pressure gauge 25 are electrically connected to the controller 15, and the controller 15 is configured to adjust the respective opening degrees of the first valve 27 and the second valve 28 by PI control based on a set value of the differential pressure. The differential pressure regulating valve 29 and the differential pressure gauge 26 are electrically connected to the controller 15, and the controller 15 is configured to adjust the opening degree of the differential pressure regulating valve 29 by PI control based on the set value of the differential pressure.

The controller 15 includes, for example, a Central Processing Unit (CPU), a Random Access Memory (RAM), a Read Only Memory (ROM), a computer-readable storage medium, and the like. Then, a series of processes for realizing various functions is stored in the storage medium or the like in the form of a program, as an example. The CPU reads the program out to the RAM or the like and executes processing/calculation of information, thereby realizing the various functions. A configuration where the program is installed in the ROM or another storage medium in advance, a configuration where the program is provided in a state of being stored in the computer-readable storage medium, a configuration where the program is distributed via a wired or wireless communication means, or the like may be applied. The computer-readable storage medium is a magnetic disk, a magneto-optical disk, a CD-ROM, a DVD-ROM, a semiconductor memory, or the like.

Figure 3:
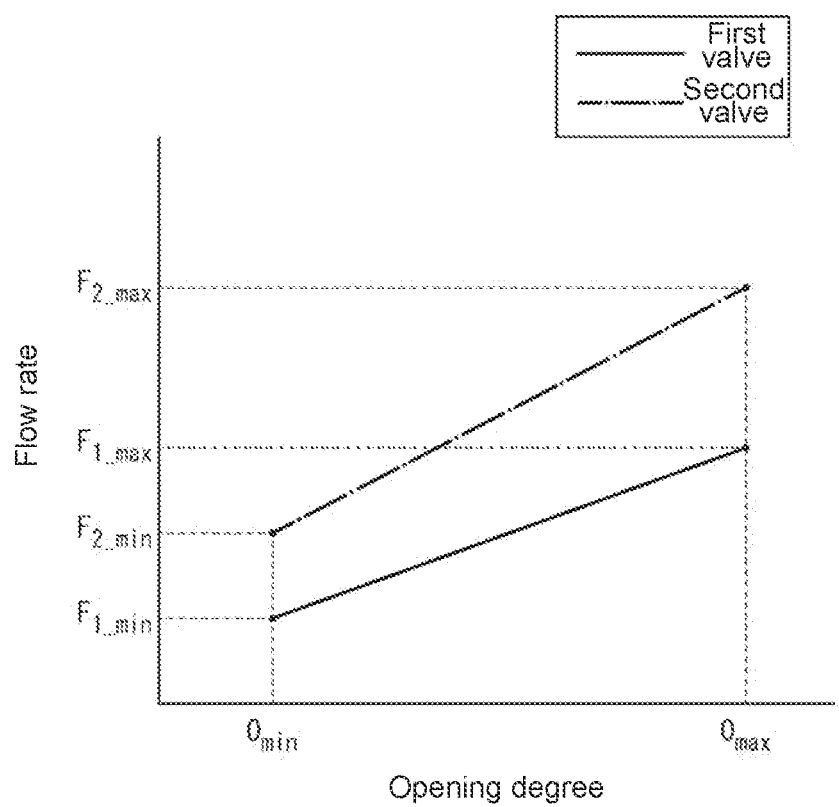
FIG. 3 is a graph schematically representing valve characteristics of a first valve and a second valve disposed in the fuel control device for the gas turbine according to an embodiment of the present disclosure.

In the present embodiment, the first valve 27 and the second valve 28 differ from each other in relationship between the opening degree and the flow rate of fuel, that is, valve characteristics. As shown in FIG. 3, the first valve 27 and the second valve 28 can control the fuel pressure between a minimum opening degree $O_{min}$ and a maximum opening degree $O_{max}$, the flow rates of fuel flowing through the respective valves are minimum flow rates $F_{1\_min}$ and $F_{2\_min}$ when the opening degree is the minimum opening degree $O_{min}$, and the flow rates of fuel flowing through the respective valves are maximum flow rates $F_{1\_max}$ and $F_{2\_max}$ when the opening degree is the maximum opening degree $O_{max}$. In the present embodiment, $F_{1\_min} < F_{2\_max}$ and $F_{1\_max} < F_{2\_max}$.

In FIG. 3, the minimum opening degree $O_{min}$ of the first valve 27 and the minimum opening degree $O_{min}$ of the second valve 28 are the same, and the maximum opening degree $O_{max}$ of the first valve 27 and the maximum opening degree $O_{max}$ of the second valve 28 are the same. However, they may be different from each other. Further. $F_{1\_max} > F_{2\_min}$ holds in FIG. 3, but $F_{1\_max} \leq F_{2\_max}$ may hold. Furthermore, in FIG. 3, a slope of the valve characteristic of the first valve 27 is greater than a slope of the valve characteristic of the second valve 28. However, the latter may be greater than the former, or the two may be the same. Moreover, although the respective valve characteristics of the first valve 27 and the second valve 28 are in a linear relationship, they may also be in a relationship represented by curve.

Operation of Gas Turbine System According to Embodiment of Present Disclosure Next, an operation of the gas turbine system 10 according to an embodiment of the present disclosure will be described. As shown in FIG. 1, the gas turbine system 10 can operate by appropriately switching between a normal operation mode which is an operation mode where the motor generator 7 is driven by the turbine 6, and a reverse power operation mode which is an operation mode where the motor generator 7 provides rotational power to the gas turbine 1.

In the normal operation mode, compressed air is supplied from the compressor 2 to the combustor 4, and fuel is supplied from the fuel supply source 11 to the combustor 4 via the fuel supply line 12, thereby burning the fuel to generate a combustion gas. The combustion gas is supplied to the turbine 6 to drive, that is, to rotate the turbine 6, the rotation of the turbine 6 is transmitted to the motor generator 7 via the rotational shaft 5, and the motor generator 7 is driven as a generator. The electric power generated by the motor generator 7 is supplied to the power system 8.

On the other hand, in the reverse power operation mode, electric power is supplied to the motor generator 7 from the power system 8 outside the gas turbine 1, whereby the motor generator 7 is driven as the motor. The rotational power generated by the motor generator 7 is provided to the gas turbine 1 to assist the operation of the gas turbine 1. Therefore, the reverse power operation mode generally consumes less fuel than the normal operation mode.

Figure 4:
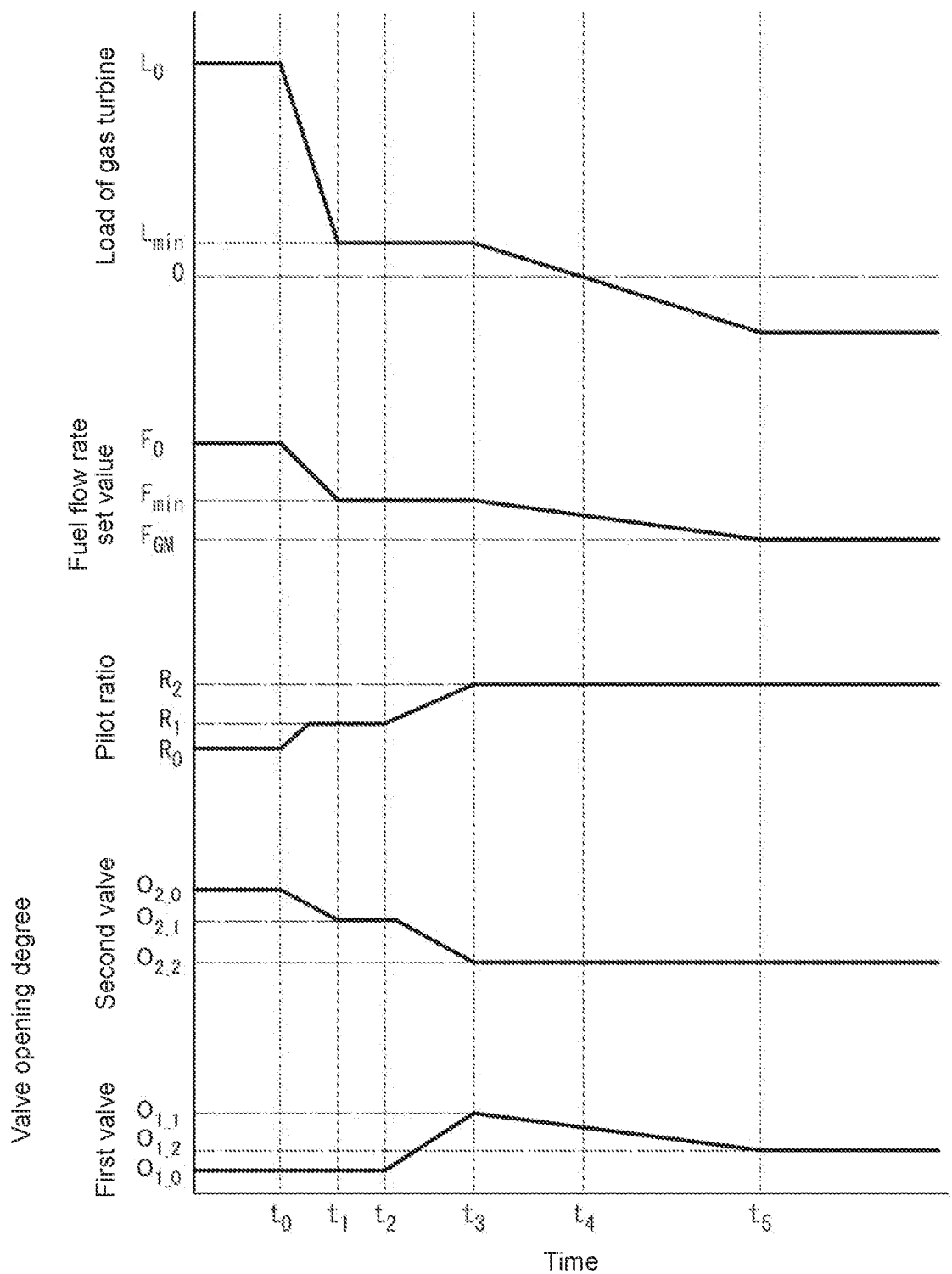
FIG. 4 is a timing chart for describing an operation of the fuel control device for the gas turbine according to the embodiment of the present disclosure.

Operation of Fuel Control Device for Gas Turbine According to Embodiment of Present Disclosure Next, an operation of the fuel control device 20 for the gas turbine 1 will be described with reference to FIGS. 1 to 3 and a timing chart of FIG. 4. The timing chart of FIG. 4 shows temporal changes of various items when the gas turbine system 10 transitions from the normal operation mode to the reverse power operation mode. Until time $t_0$, the gas turbine system 10 operates at a prescribed load $L_0$ in the normal operation mode. At the time $t_0$, an operator of the gas turbine system 10 starts a preparation to start switching to the reverse power operation mode at time $t_2$ described later.

Based on the operation of the operator at the time $t_0$, the controller 15 changes over time a fuel flow rate set value which is a parameter used to control the fuel supply amount to the combustor 4, thereby decreasing the fuel flow rate set value from a fuel supply amount $F_0$ in a case where the gas turbine system 10 operates at the load $L_0$ to a fuel supply amount $F_{min}$ in a case where the gas turbine system 10 operates at a minimum load $L_{min}$ described later. Further, the controller 15 controls the main fuel control valve 23 and the pilot fuel control valve 24 based on the fuel flow rate set value and a set value of the pilot ratio, thereby decreasing the opening degree of each fuel control valve to respond to the decrease in the fuel flow rate set value. Specifically, the controller 15 calculates, based on the fuel flow rate set value and the pilot ratio, the respective fuel supply amounts to be supplied to the main nozzle and the pilot nozzle, and transmits signals which indicate the opening degrees corresponding to the respective fuel supply amounts to the main fuel control valve 23 and the pilot fuel control valve 24, respectively. Based on the signals, the opening degrees of the main fuel control valve 23 and the pilot fuel control valve 24 are controlled. Further, the opening degree of the second valve 28 and the opening degree of the differential pressure regulating valve 29 are adjusted, respectively, such that respective detected values of the differential pressure gauges 25 and 26 become the set values. Specifically, the appropriate opening degrees are calculated by performing PI control based on the differences between the set values and the detected values of the respective differential pressure gauges, and signals indicating said opening degrees are transmitted to the second valve 28 and the differential pressure regulating valve 29. By thus controlling the fuel supply to the combustor 4 with the controller 15, the fuel supply amount is decreased from the initial fuel supply amount $F_0$ toward the minimum supply amount $F_{min}$ described later, while controlling the pressure of the fuel supplied to the main nozzle and the pilot nozzle. As a result, the load of the gas turbine system 10 decreases and becomes the minimum load $L_{min}$ at the time $t_1$. Herein, the operation at the minimum load $L_{min}$ is a no-load constant-speed operation, and means an operation in a state where the fuel supply amount to the combustor 4 in the normal operation mode is set to the minimum value, that is, the minimum supply amount $F_{min}$.

In the present embodiment, from the time $t_0$ to the time $t_2$, the controller 15 maintains the opening degree of the first valve 27 at an initial opening degree $O_{1\_0}$ and decreases the opening degree of the second valve 28 from the initial $O_{2\_0}$ to $O_{2\_1}$ at time the $t_1$, thereby controlling the pressure of the fuel supplied to the main nozzle to the set value. Further, along with decreasing the fuel supply amount to each of the main nozzle and the pilot nozzle at the time $t_0$, the controller 15 starts increasing the pilot ratio (the ratio of the fuel supply amount to the pilot nozzle to the fuel supply amount to the combustor 4) from the initial Pilot ratio $R_0$. Consequently, even if the fuel supply amount to the combustor 4 decreases, a state is possible in which the combustor 4 is more unlikely to misfire. Before reaching the time $t_1$, the pilot ratio increases from $R_0$ to $R_1$. Further, at the time $t_0$, the controller 15 may control the actuator 3B, thereby adjusting the opening degree of the IGV 3A to such an opening degree at which the combustor 4 does not misfire.

The operating condition at the time $t_1$ is maintained from the time $t_1$ to the time $t_2$. The operation period from the time $t_1$ to the time $t_2$ is a time for receiving a command signal from the operator, or a command signal from the gas turbine system 10 or another system connected to the gas turbine system 10, as to switching of the operation mode. At the time $t_2$, for example, the operator of the gas turbine system 10 presses an operation mode switch button to start switching from the normal operation mode to the reverse power operation mode. At the time $t_2$, the controller 15 starts increasing the pilot ratio while maintaining the fuel supply amount to the combustor 4 at the minimum supply amount $F_{min}$, and sets the pilot ratio to $R_2$ at the time $t_3$.

In order to increase the pilot ratio from $R_1$ to $R_2$ while maintaining the fuel supply amount to the combustor 4 at the minimum supply amount $F_{min}$, the controller 15 decreases the opening degree of the main fuel control valve 23 and increases the opening degree of the pilot fuel control valve 24. At this time, the controller 15 increases the opening degree of the first valve 27 from the time $t_2$ to the time $t_3$ and decreases the opening degree of the second valve 28 substantially synchronously, such that the detected value of the differential pressure gauge 25 becomes the set value. At the time $t_1$ when the pilot ratio is $R_2$, the opening degree of the second valve 28 decreases to $O_{2\_2}$ and the opening degree of the first valve 27 increases to $O_{1\_1}$. Further, between the time $t_2$ and the time $t_3$, the controller 15 may control the actuator 3B, thereby controlling the opening degree of the IGV 3A to such an opening degree suitable for the reverse power operation mode.

From the time $t_3$ to time $t_5$, the controller 15 controls the fuel flow rate set value to the combustor 4, thereby decreasing the fuel supply amount from $F_{min}$ to a supply amount $F_{GM}$ for the reverse power operation mode. The controller 15 transmits, based on the fuel flow rate set value and the value of the pilot ratio, signals indicating information on the opening degrees to the main fuel control valve 23 and the pilot fuel control valve 24, respectively. Further, the opening degree of the first valve 27 and the opening degree of the differential pressure regulating valve 29 are adjusted, respectively, such that respective detected values of the differential pressure gauges 25 and 26 become target differential pressure set values.

Specifically, after the time $t_3$, the controller 15 keeps the opening degree of the second valve 28 constant at $O_{2\_2}$ (including keeping the second valve 28 fully closed) and regulates the differential pressure between the upstream side and the downstream side of the main fuel control valve 23 only by adjusting the opening degree of the first valve 27, thereby regulating the pressure of the fuel supplied to the main nozzle. Although not shown in FIG. 4, in the normal operation mode before the time $t_0$, the fuel supply amount to the combustor 4 is large relative to the reverse power operation mode, and thus a regulation target for regulating the pressure of the fuel supplied to the main nozzle is the second valve 28. Therefore, the controller 15 changes the regulation target for regulating the pressure of the fuel supplied to the main nozzle from the second valve 28 to the first valve 27 after the time $t_3$.

Although the load of the gas turbine system 10 becomes zero at time $t_4$, the fuel supply amount to the combustor 4 is decreased by further decreasing the fuel flow rate set value. After the time $t_4$, electric power is supplied from the power system 8 to the motor generator 7. Therefore, after the time $t_4$, the motor generator 7 is driven as the motor, and the rotational power generated by the motor generator 7 is provided to the gas turbine 1. At the time $t_5$, the fuel supply amount to the combustor 4 reaches the fuel supply amount $F_{GM}$ for the reverse power operation mode, and the switching operation to the reverse power operation mode is completed. At this time, the opening degree of the first valve 27 decreases to $O_{1\_2}$. Although $O_{1\_2} > O_{1\_0}$ holds in FIG. 4, $O_{1\_2} \leq O_{1\_0}$ can be established depending on the magnitude of the opening degree $O_{1\_0}$ of the first valve 27 in the normal operation mode.

In the present embodiment, the pressure of the fuel supplied to the main nozzle is regulated only by adjusting the opening degree of the first valve 27, in the reverse power operation mode. Therefore, the discontinuity of the fuel supply amount based on valve characteristics is eliminated by the absence of switching between the first valve 27 and the second valve 28 in the reverse power operation mode, making it possible to suppress fluctuation in operation of the gas turbine 1 and making it possible to appropriately control the fuel supply to the gas turbine 1 during operation in the reverse power operation mode.

Modified Example of Operation of Fuel Control Device for Gas Turbine According to Embodiment of Present Disclosure In the present embodiment, the regulation target for regulating the pressure of the fuel supplied to the main nozzle is changed from the second valve 28 to the first valve 27 by the time $t_3$, that is, by the time when the load of the gas turbine system 10 starts to decrease from the minimum load $L_{min}$. However, the present disclosure is not limited to this form. Such a change may be made at least by the time $t_5$, that is, by the time when the switching operation to the reverse power operation mode is completed by decreasing the fuel supply amount to the combustor 4 to $F_{GM}$. Thus, such a change can also be made before the time $t_3$, for example, before the fuel supply amount to the combustor 4 is decreased to the flow rate for no-load constant-speed operation, that is, by the time $t_1$. By doing so, it is possible to appropriately control the fuel supply to the gas turbine even during switching from the normal operation mode to the reverse power operation mode.

In the present embodiment, when switching from the normal operation mode to the reverse power operation mode, the opening degree of the first valve 27 is made to be larger than the opening degree in the normal operation mode and the opening degree of the second valve 28 is made to be smaller than the opening degree in the normal operation mode, and then the regulation target for regulating the fuel pressure is changed from the second valve 28 to the first valve 27, but this operation is not essential. However, by performing such operation, it is possible to more appropriately control the fuel supply to the combustor in the reverse power operation mode.

In the present embodiment, the opening degree of the second valve 28 has the constant value after the regulation target for regulating the pressure of the fuel supplied to the main nozzle is changed from the second valve 28 to the first valve 27. However, the present disclosure is not limited to this form. A state may be possible in which the opening degree of the second valve 28 fluctuates within a very narrow range regardless of the regulation of the pressure of the fuel supplied to the main nozzle. However, if the opening degree of the second valve 28 is maintained at the constant value, the regulation target for regulating the fuel pressure in the reverse power operation mode can completely be only the first valve 27, making it possible to more appropriately control the fuel supply to the combustor 4 in the reverse power operation mode.

In the present embodiment, the two valves having different valve characteristics, that is, the first valve 27 and the second valve 28 are used as the differential pressure regulating valves for regulating the pressure of the fuel supplied to the main nozzle. However, the present disclosure is not limited to this form, and two valves having the same valve characteristics may be used. In this modified example, the regulation target for regulating the pressure of the fuel supplied to the main nozzle is the two valves in the normal operation mode, and the regulation target for regulating the pressure of the fuel supplied to the main nozzle is only one of the two valves in the reverse power operation mode. Also in this modified example, the discontinuity of the fuel supply amount is eliminated by the absence of switching of the number of regulation target valves in the reverse power operation mode, making it possible to suppress fluctuation in operation of the gas turbine 1 and making it possible to appropriately control the fuel supply to the combustor 4.

In this modified example, the number of valves is not two, but may be any number of not less than three. In this case, the same technical effect can be obtained by setting the regulation target for regulating the pressure of the fuel supplied to the main nozzle to at least two valves among not less than three valves in the normal operation mode and setting the regulation target for regulating the pressure of the fuel supplied to the main nozzle to any one of not less than three valves in the reverse power operation mode.

In the present embodiment, electric power is supplied from the power system 8 to the motor generator 7 in the reverse power operation mode. However, the present disclosure is not limited to this form. The motor generator 7 may be supplied with electric power that is excessive in another plant or the like.

In the present embodiment, only the regulation of the pressure of the fuel supplied to the main nozzle has been described. However the pressure of the fuel supplied to the pilot nozzle can also be regulated by performing the same control with the configuration where the differential pressure regulating valve 29 is formed of the first valve and the second valve.

The contents described in the above embodiments would be understood as follows, for instance.

[1] A fuel control device for a gas turbine according to one aspect is a fuel control device (20) for a gas turbine (1), the gas turbine (1) including a compressor (2) for producing compressed air, a combustor (4) for burning fuel with the compressed air, and a turbine (6) driven by a combustion gas generated by burning the fuel in the combustor (4), and being switchable between a normal operation mode which is an operation mode where a motor generator (7) is driven by the turbine (6) and a reverse power operation mode which is an operation mode where the motor generator (7) provides the rotational power to the gas turbine (1), the fuel control device (20) including: a first valve (27) capable of regulating a pressure of the fuel supplied to the combustor (4) within a flow rate range of a first lower limit value ($F_{1\_min}$) and a first upper limit value ($F_{1\_max}$); and a second valve (28) capable of regulating the pressure of the fuel supplied to the combustor (4) within a flow rate range of a second lower limit value ($F_{2\_min}$) larger than the first lower limit value ($F_{1\_min}$) and a second upper limit value ($F_{2\_max}$) larger than the first upper limit value ($F_{1\_max}$). A regulation target for regulating the pressure of the fuel is changed from the second valve (28) to the first valve (27) before a flow rate of the fuel is decreased to a flow rate for the reverse power operation mode, when switching from the normal operation mode to the reverse power operation mode.

With the fuel control device for the gas turbine according to the present disclosure, the discontinuity of the fuel supply amount based on valve characteristics is eliminated during operation in the reverse power operation mode by the absence of switching between the first valve and the second valve in the reverse power operation mode, making it possible to suppress fluctuation in operation of the gas turbine and making it possible to appropriately control the fuel supply to the combustor.

[2] A fuel control device for a gas turbine according to another aspect is the fuel control device for the gas turbine of [1], wherein the regulation target for regulating the pressure of the fuel is changed from the second valve (28) to the first valve (27) before the flow rate of the fuel is decreased to a flow rate ($F_{min}$) for no-load constant-speed operation, when switching from the normal operation mode to the reverse power operation mode.

With such configuration, it is possible to appropriately control the fuel supply to the combustor even during switching from the normal operation mode to the reverse power operation mode.

[3] A fuel control device for a gas turbine according to still another aspect is the fuel control device for the gas turbine of [1] or [2], wherein the regulation target for regulating the pressure of the fuel is changed from the second valve (28) to the first valve (27) after an opening degree of the first valve (27) is made to be larger than an opening degree in the normal operation mode and an opening degree of the second valve (28) is made to be smaller than the opening degree in the normal operation mode, when switching from the normal operation mode to the reverse power operation mode.

With such configuration, since the amount of the decrease in fuel flow rate by the first valve can be increased, it is possible to more appropriately control the fuel supply to the combustor in the reverse power operation mode.

[4] A fuel control device for a gas turbine according to yet another aspect is the fuel control device for the gas turbine of any of [1] to [3], wherein an opening degree of the second valve (28) is maintained at a constant value after the regulation target for regulating the pressure of the fuel is changed from the second valve (28) to the first valve (27).

With such configuration, the regulation target for regulating the fuel pressure during operation in the reverse power operation mode can completely be only the first valve, making it possible to more appropriately control the fuel supply to the combustor during operation in the reverse power operation mode.

[5] A fuel control device for a gas turbine according to one aspect is a fuel control device (20) for a gas turbine (1), the gas turbine (1) including a compressor (2) for producing compressed air, a combustor (4) for burning fuel with the compressed air, and a turbine (6) driven by a combustion gas generated by burning the fuel in the combustor (4), and being switchable between a normal operation mode which is an operation mode where a motor generator (7) is driven by the turbine (6) and a reverse power operation mode which is an operation mode where the motor generator (7) provides the rotational power to the gas turbine (1), the fuel control device (20) including a plurality of valves capable of regulating a pressure of the fuel supplied to the combustor (4). A regulation target for regulating the pressure of the fuel is at least two valves among the plurality of valves, in the normal operation mode. The regulation target for regulating the pressure of the fuel is changed to one valve among the plurality of valves before a flow rate of the fuel is decreased to a flow rate for the reverse power operation mode, when switching from the normal operation mode to the reverse power operation mode.

With the fuel control device for the gas turbine according to the present disclosure, the discontinuity of the fuel supply amount based on valve characteristics is eliminated during operation in the reverse power operation mode by the absence of switching between the first valve and the second valve in the reverse power operation mode, making it possible to suppress fluctuation in operation of the gas turbine and making it possible to appropriately control the fuel supply to the combustor.

REFERENCE SIGNS LIST

1 Gas turbine
2 Compressor
4 Combustor
6 Turbine
7 Motor generator
10 Gas turbine system
20 Fuel control device
27 First valve
28 Second valve

The invention claimed is:
1. A fuel control device for a gas turbine,
the gas turbine comprising a compressor for producing compressed air, a combustor for burning fuel with the compressed air, and a turbine driven by a combustion gas generated by burning the fuel in the combustor, and being switchable between a normal operation mode which is an operation mode where a motor generator is driven by the turbine and a reverse power operation mode which is an operation mode where the motor generator provides a rotational power to the gas turbine,
the fuel control device comprising:
a first valve capable of regulating a pressure of the fuel supplied to the combustor within a flow rate range of a first lower limit value and a first upper limit value;
a second valve capable of regulating the pressure of the fuel supplied to the combustor within a flow rate range of a second lower limit value larger than the first lower limit value and a second upper limit value larger than the first upper limit value; and a controller configured to adjust respective opening degrees of the first valve and the second valve, wherein a regulation target for regulating the pressure of the fuel is changed from the second valve to the first valve by the controller after an opening degree of the first valve is made to be larger than an opening degree in the normal operation mode and an opening degree of the first valve is made to be larger than the opening degree of the first valve in the normal operation mode and an opening degree of the second valve is made to be smaller than the opening degree of the second valve in the normal operation mode before a flow rate of the fuel is decreased to a flow rate for the reverse power operation mode.

2. The fuel control device for the gas turbine according to claim 1, wherein the regulation target for regulating the pressure of the fuel is changed from the second valve to the first valve by the controller after the opening degree of the first valve is made to be larger than the opening degree of the first valve in the normal operation mode and the opening degree of the second valve is made to be smaller than the opening degree of the second valve in the normal operation mode before the flow rate of the fuel is decreased to a flow rate for no-load constant-speed operation, when switching from the normal operation mode to the reverse power operation mode.

3. The fuel control device for the gas turbine according to a claim 1, wherein the controller maintains the opening degree of the second valve at a constant value after the regulation target for regulating the pressure of the fuel is changed from the second valve to the first valve.

\* \* \* \* \*